US005549220A

United States Patent [19]

Whalen

[11] Patent Number: 5,549,220

[45] Date of Patent: Aug. 27, 1996

[54] NON-LETHAL DEVICE FOR SELF-DEFENSE

[76] Inventor: Patrick J. Whalen, 2052 Cedardale Ave., Baton Rouge, La. 70808

[21] Appl. No.: 307,151

[22] Filed: Sep. 16, 1994

[51] Int. Cl.[6] .................... G01F 11/00

[52] U.S. Cl. .................... 222/1; 116/81; 222/79; 222/113; 222/192; 222/402.11; 362/102; 362/109

[58] Field of Search .................... 222/1, 78, 79, 222/113, 192, 402.1, 402.11, 402.13, 470, 471, 472, 473, 474; 116/2, 77, 81, DIG. 44; 362/102, 109

[56] References Cited

U.S. PATENT DOCUMENTS

| | | | |
|---|---|---|---|
| 3,776,429 | 12/1973 | DeLucia | 222/192 X |
| 4,186,851 | 2/1980 | Cantor | 222/113 |
| 4,223,804 | 9/1980 | Morris et al. | 222/192 X |
| 4,239,129 | 12/1980 | Esposito | 222/79 |
| 4,750,641 | 6/1988 | Chin-Fu | 222/79 |
| 4,968,034 | 11/1990 | Hsieh | 273/84 ES |
| 5,086,377 | 2/1992 | Roberts | 362/102 |
| 5,199,280 | 6/1992 | Yang | 362/191 |
| 5,321,591 | 6/1994 | Cimock et al. | 362/102 X |
| 5,331,523 | 7/1994 | Delzer | 222/192 X |
| 5,373,427 | 12/1994 | McLean | 222/192 X |
| 5,420,766 | 5/1995 | Hollis | 222/113 X |

*Primary Examiner*—Andres Kashnikow
*Assistant Examiner*—Joseph A. Kaufman
*Attorney, Agent, or Firm*—Reginald F. Roberts, Jr.

[57] ABSTRACT

A non-lethal, graded method for deterring an assailant by using a hand-held self-defense device which includes an electrical storage battery which acts as a power source, a lamp which emits a directed beam of high-intensity white light, a lamp which emits high-intensity diffuse blue light, a siren, and a source of pressurized chemical repellent. First, an intense beam of white light is directed at the eyes of the assailant; then intermittent high-intensity diffuse blue light and high-intensity sound are simultaneously emitted. If these operations prove inadequate to deter the attack, a spray of chemical repellent is discharged at the eyes of the assailant, using the beam of white light as a guide.

1 Claim, 3 Drawing Sheets

NON-LETHAL DEVICE FOR SELF-DEFENSE

BACKGROUND OF THE INVENTION

The present invention relates to self-defense. More particularly, the invention relates to a hand-held, portable, non-lethal, self-defense device.

U.S. Pat. No. 4,186,851 to Cantor discloses a non-lethal personal defense weapon providing for the simultaneous projection of a high-intensity beam of light and a concentrated chemical spray designed to immobilize attackers. The spray discharge and the light-emitting mechanism are controlled by a two-position switch which ensures that the high-intensity beam of light and the spray discharge may be substantially simultaneously energized.

U.S. Pat. No. 4,968,034 to Hsieh discloses a multi-functional electronic self-protection device. The device includes a flashlight with a reflector which also mounts shock blocks. The casing includes a circuit board and booster together with a battery, and in the base thereof a buzzer is mounted. A first switch controls the flashlight so that rotation of the lens case will turn the light on and off. A second switch controls the generation of an electric charge at the shock block so that when the casing is rotated and the switch depressed, a strong electrical charge will be generated at the shock blocks. The base is also slidably mounted on the casing; and by slidably displacing the base, a third switch activates the buzzer, which is coupled also to the battery.

U.S. Pat. No. 5,086,377 to Roberts discloses a non-lethal self-defense weapon having an elongated baton-like housing with a centrally-positioned grip. Opposite housing sections contain audible and visible alarm devices and a flashlight. A replaceable aerosol defense spray container is positioned in the housing, with an actuator and nozzle positioned relative to the grip so as to aim the discharge away from the user and toward an assailant.

U.S. Pat. No. 5,119,280 to Yang-discloses a multipurpose flashlight comprising a casing which defines therein a battery chamber for holding a battery set and a storage chamber for holding medicines or small accessories, a back cover detachably attached to said casing at the back which has magnets for mounting on a metal surface and a socket for connecting to an external power supply, an alarm and light source set detachably attached to said casing at the front, which comprises a buzzer, an electronic circuit and a lampholder for producing audio and visual signals, and a projector detachably attached to said alarm and light source set at the front and moved to control the operation of said electronic circuit. A device for generating an electrical shock may be attached to the casing for body defense.

It is well-known that violent crimes against persons have increased alarmingly in recent years. Accordingly, many people who are engaged in recreational or business activities, or who travel for business or recreation, frequently carry various protective devices for defending themselves against would-be attackers.

While the foregoing patents are representative of devices which provide such protection, they are one and all lacking in one very important aspect: they fail to provide a graded deterrency. A need therefore exists for a device and a method which permit a potential victim to deter a would-be assailant by a plurality of means or steps of increasing severity. Such a device and method, which are provided by the present invention, have the tremendous and humane advantage of permitting the self-defender to restrict his or her self-defense to the minimum required to deter a potential assailant.

SUMMARY OF THE INVENTION

In general, the present invention in a first aspect provides a first embodiment of a non-lethal self-defense device. The first embodiment of the device comprises (a) an electrical storage battery to provide electrical power for the device; (b) a source for emitting a directed, steady beam of high-intensity, visible radiation; (c) a source for emitting intermittent, diffuse, high-intensity visible radiation; (d) a source of high-intensity sound; (e) a source of a pressurized chemical repellent; (f) means for discharging a spray of the chemical repellent at a potential assailant; and (g) a housing for the battery, the source of visible radiation, the source of sound, the source of chemical repellent, and the means for discharging the spray of repellent. The source for emitting the steady beam of visible radiation, the source for emitting the intermittent, diffuse, visible radiation, and the source of high-intensity sound are electrically connected to the battery.

In a second aspect the invention provides a second embodiment of a non-lethal self-defense device. The second embodiment of the device comprises (a) an electrical storage battery to provide electrical power for the device; (b) a source for emitting a directed, steady, intense beam of white light; (c) a source for emitting intermittent, high-intensity, diffuse blue light; (d) a source of high-intensity sound; (e) a source of a pressurized chemical repellent; (f) a control switch which serves as a trigger for emitting the steady beam of white light and the intermittent blue light; (g) a control button for discharging the spray of chemical repellent when the second control button is depressed; and (h) a housing for the battery, the sources of white and blue light, the source of sound, the source of chemical repellent, the control switch, and the control button. The source for emitting the steady beam of white light, the source for emitting the intermittent, diffuse, blue light, and the source of high-intensity sound are electrically connected to the battery. The control switch is constructed and arranged so that a steady beam of white light is emitted in a first stage when the switch is moved to a first position; and intermittent, diffuse, blue light and high-intensity sound are emitted in a second stage when the switch is moved to a second position.

In a third aspect the invention provides a method for deterring an assailant. The method comprises a sequence of operations, each of which increases the severity of the deterrence.

As a first step, an intense beam of white light is directed at the eyes of the assailant. This operation locates and illumininates, partially and temporarily blinds, and provides direction for further deterring the assailant.

As a second step, if the assailant has not desisted, intermittent high-intensity, diffuse blue light and high-intensity sound are simultaneously emitted. This operation disconcerts and disorients the assailant, and attracts attention to the situation.

As a third step, if the assailant has not desisted, a spray of chemical repellent is discharged at the eyes of the assailant, using the beam of white light as a directional guide. This operation completely and temporarily blinds the assailant, and renders the assailant incapable of attacking an intended victim.

DETAILED DESCRIPTION OF THE INVENTION

Figure 1:
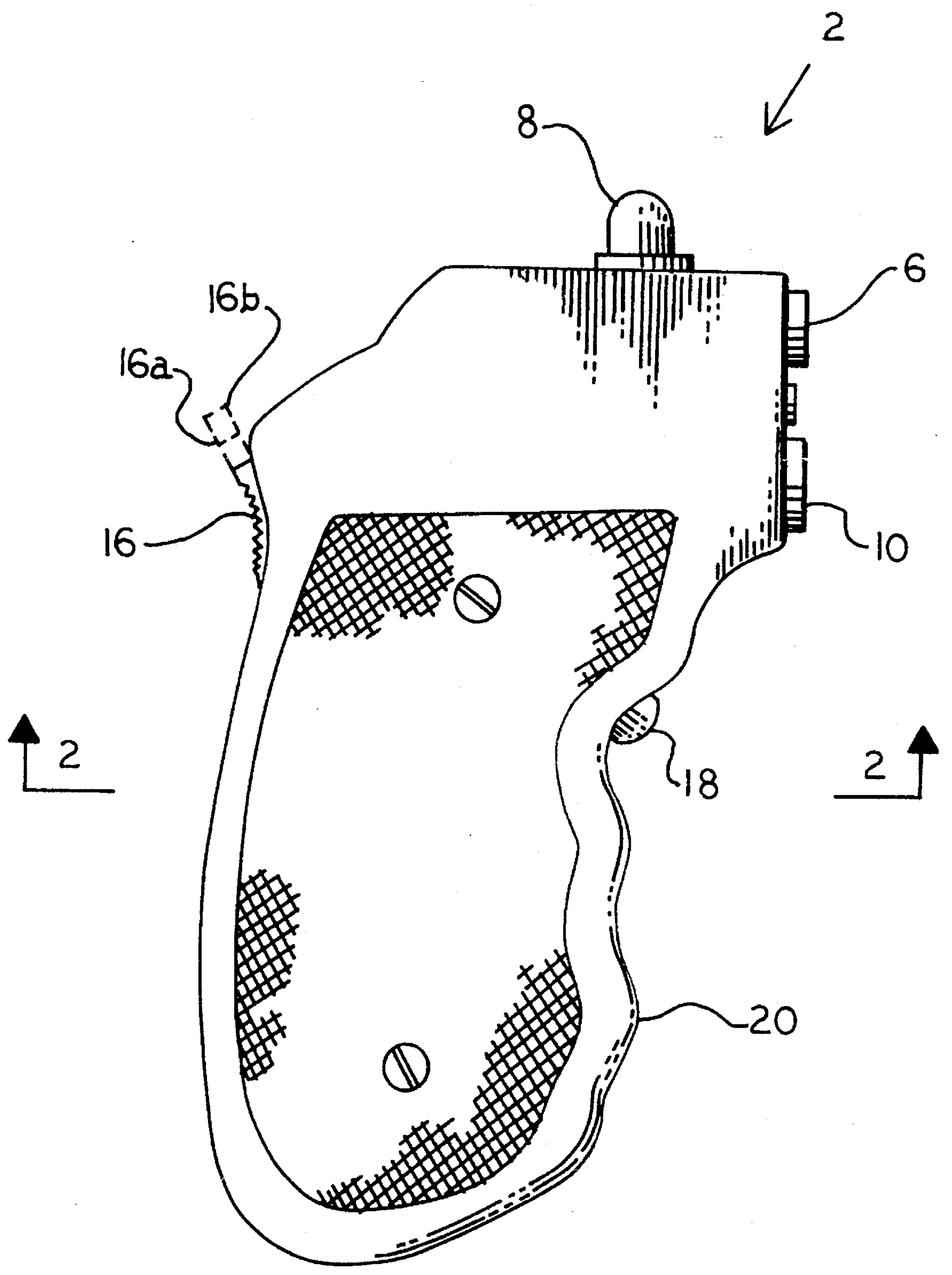
FIG. 1 is a side elevation of a self-defense device, made in accordance with the principles of the present invention.
Figure 2:
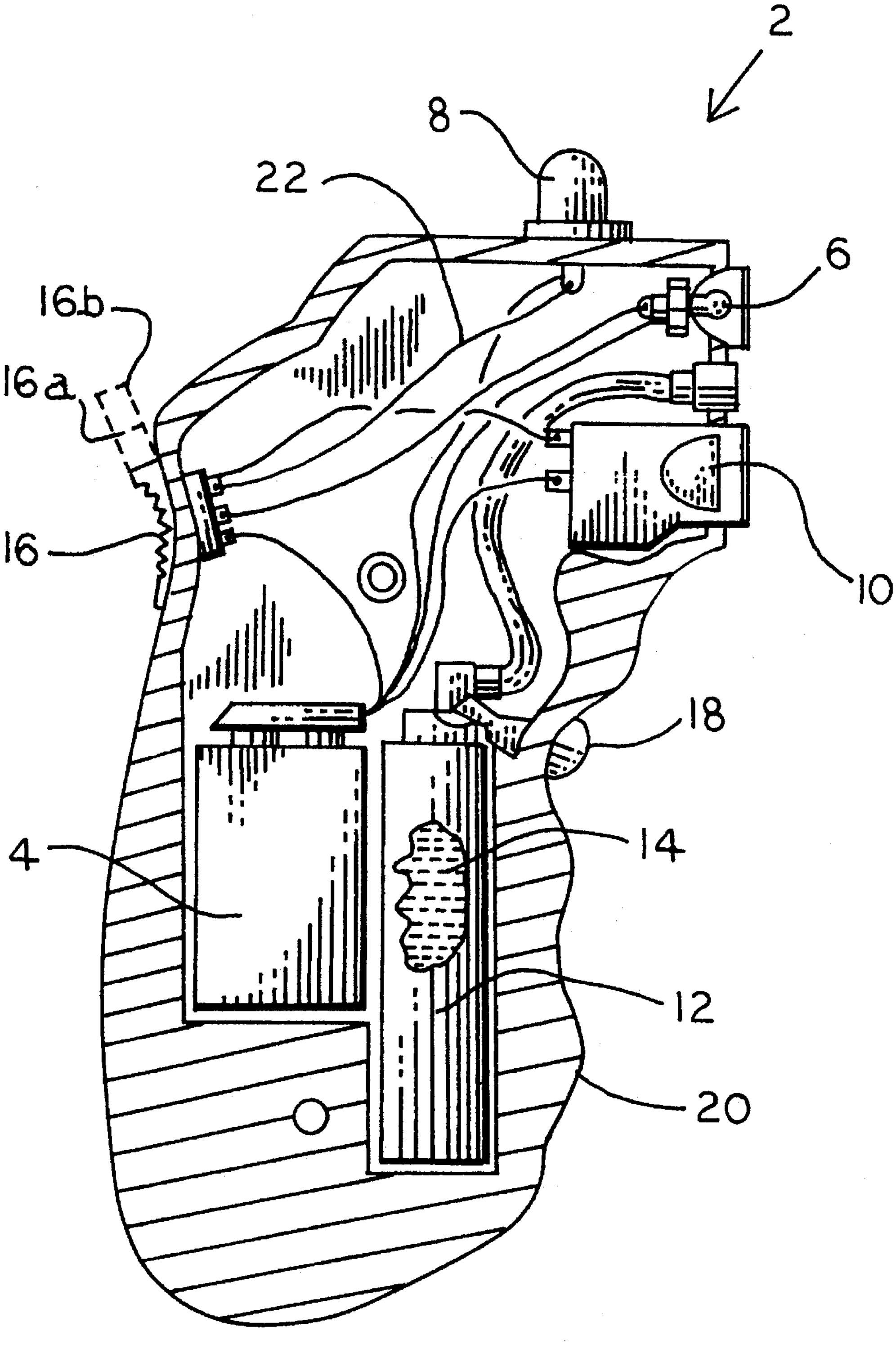
FIG. 2 is a cross-sectional view of the device shown in FIG. 1, taken along the cutting line 2—2.
Figure 3:
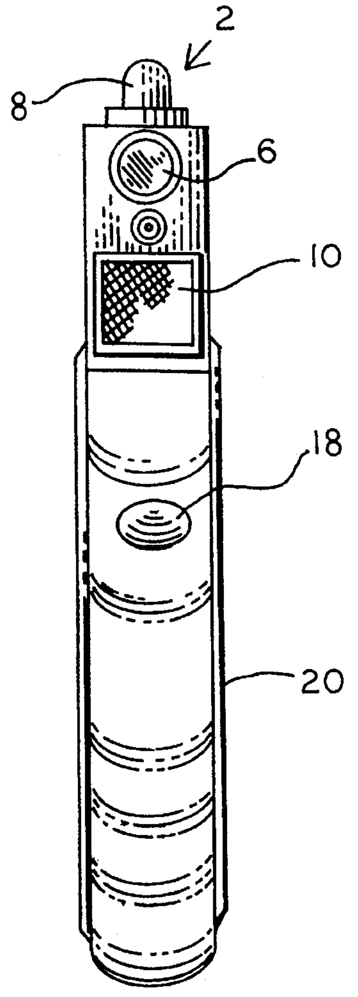
FIG. 3 is an end view of the device shown in FIG. 1.

More specifically, reference is made to FIGS. 1–3, in which is shown a hand-held self-defense device made in accordance with the principles of the present invention, and generally designated by the numeral 2.

An electrical storage battery 4 provides electrical power for the device 2, which includes an incandescent lamp as a source 6 for emitting a directional, steady, intense beam of white light. The device 2 further includes a source 8 for emitting intermittent, high-intensity, diffuse blue light; a source 10 of high-intensity sound; and a pressurized container 12 of a chemical repellent 14.

A sliding control switch 16 serves as a trigger for emitting the steady beam of white light and the intermittent blue light. A control button 18 discharges a spray of the chemical repellent 14 when the control button 18 is depressed. The battery 4, the source 6 of white light, the source 8 of blue light, the source 10 of sound, the container 12 of chemical repellent 14, the control switch 16, and the control button 18 are disposed in a housing 20. The source 6 of white light, the source 8 of blue light, and the source 10 of high-intensity sound are electrically connected by suitable conductive wiring 22 to the battery 4.

The control switch 16 is constructed, and arranged so that a steady beam of white light is emitted in a first stage when the switch 16 is pushed to a first position 16*a*, and intermittent, diffuse blue light and high-intensity sound are emitted in a second stage when the switch 16 is pushed to a second position 16*b*.

The present invention provides graded deterrence, permitting the user and intended victim to offer deterrence of increasing degrees of severity. If the attacker desists after experiencing the first level of deterrence, there is no need to proceed to the second level. If the attacker desists after experiencing the second level of deterrence, there is no need to proceed to the third level.

As a first step, an intense beam of white light is directed at the eyes of the assailant. This operation locates, illuminates, partially and temporarily blinds, and provides direction for further deterring the assailant.

As a second step, if the assailant has not desisted, an intermittent beam of high-intensity, diffuse blue light and a high-intensity sound are simultaneously emitted. This operation disconcerts and disorients the assailant, and attracts attention to the situation.

As a third and final step, if the assailant has still not desisted, a spray of chemical repellent 14 is discharged at the eyes of the assailant, using the beam of white light as a directional guide. This operation completely and temporarily blinds the assailant, and renders the assailant incapable of attacking an intended victim.

Any chemical repellent which is non-lethal and which does not cause permanent blindness may be used. The preferred repellent is a one to five percent solution by weight of oleo resin capsicum (red pepper) in a halocarbon pressurized with nitrogen, marketed under the trademark "Gazgun".

A suitable system for discharging a spray of the repellent 14 from the container 12 is described by Cantor, U.S. Pat. No. 4,186,851, which is hereby incorporated by reference. This patent likewise describes visual and audial systems which are suitable for emitting the high-intensity beam of white light and the high-intensity sound disclosed and claimed in the present application.

The source 8 of intermittent, diffuse blue light is preferably an incandescent lamp provided with a blue filter and an intermittent on-off electrical switch (not shown).

Figure 4:
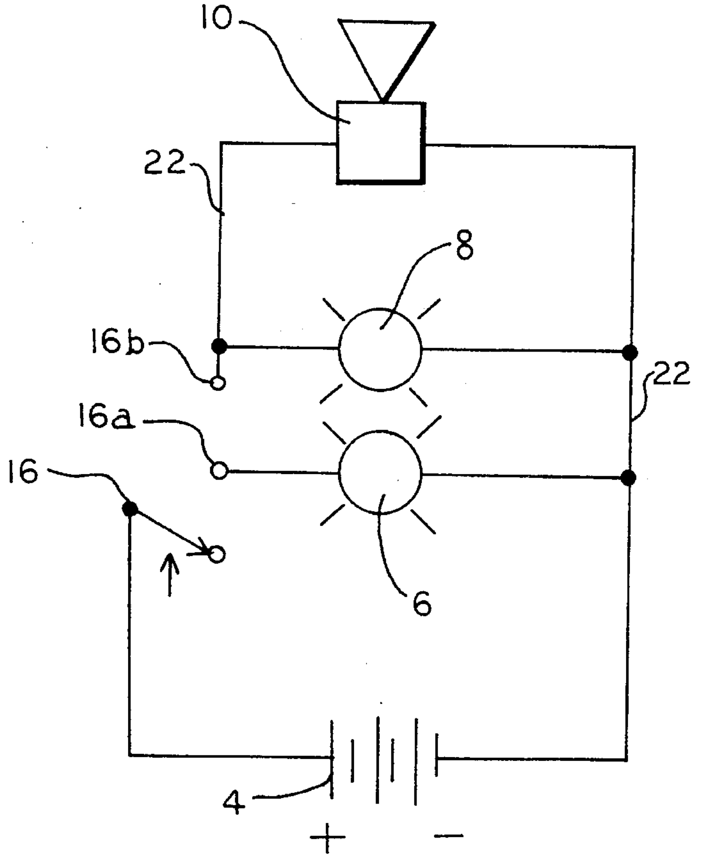
FIG. 4 is a wiring diagram showing the electrical connections for the self-defense device shown in FIGS. 1–3.

An electrical wiring diagram showing the electrical connections for the self-defense device 2 is shown in FIG. 4.

I claim:

1. A method for deterring an assailant, the method comprising, in sequence, the steps of:

(a) as a first step, directing an intense beam of white light at the eyes of the assailant, thereby locating and illuminating the assailant, partially and temporarily blinding the assailant, and providing direction for further deterring the assailant;

(b) as a second step, if the assailant has not desisted, effecting the simultaneous emission of intermittent, high-intensity, diffuse blue light and high-intensity sound, to disconcert and disorient the assailant, and to attract attention to the situation; and (c) as a third step, if the assailant has not desisted, discharging a spray of chemical repellent at the eyes of the assailant, using the beam of white light as a directional guide therefor, thereby completely and temporarily blinding the assailant and rendering the assailant incapable of attacking an intended victim.

* * * * *